(12) United States Patent
Billerey-Mosier

(10) Patent No.: US 7,930,169 B2
(45) Date of Patent: Apr. 19, 2011

(54) METHODS AND SYSTEMS FOR GENERATING NATURAL LANGUAGE DESCRIPTIONS FROM DATA

(75) Inventor: Roger Billerey-Mosier, Alameda, CA (US)

(73) Assignee: Classified Ventures, LLC, Chicago, IL (US)

( * ) Notice: Subject to any disclaimer, the term of this patent is extended or adjusted under 35 U.S.C. 154(b) by 1110 days.

(21) Appl. No.: 11/333,161

(22) Filed: Jan. 17, 2006

(65) Prior Publication Data

US 2006/0178868 A1 Aug. 10, 2006

Related U.S. Application Data

(60) Provisional application No. 60/644,438, filed on Jan. 14, 2005.

(51) Int. Cl.
*G06F 17/27* (2006.01)
*G06F 17/28* (2006.01)
*G06F 17/30* (2006.01)
*G06Q 10/00* (2006.01)

(52) U.S. Cl. ........... 704/9; 704/4; 704/7; 705/28; 707/1; 707/3; 707/100

(58) Field of Classification Search .................. 704/7, 9; 707/3, 100
See application file for complete search history.

(56) References Cited

U.S. PATENT DOCUMENTS

| | | | | |
|---|---|---|---|---|
| 5,715,468 A | * | 2/1998 | Budzinski | 704/9 |
| 6,023,669 A | * | 2/2000 | Suda et al. | 704/2 |
| 6,098,034 A | * | 8/2000 | Razin et al. | 704/9 |
| 6,126,306 A | * | 10/2000 | Ando | 708/605 |
| 6,629,066 B1 | * | 9/2003 | Jackson et al. | 704/9 |
| 6,986,104 B2 | * | 1/2006 | Green et al. | 715/234 |

(Continued)

OTHER PUBLICATIONS

Theune et al., "*From Data to Speech: A General Approach*," Natural Language Engineering, vol. 7, No. 1, pp. 47-86 (2001).

*Primary Examiner* — Richemond Dorvil
*Assistant Examiner* — Olujimi A Adesanya
(74) *Attorney, Agent, or Firm* — Marshall, Gerstein & Borun LLP

(57) ABSTRACT

The invention is directed to a natural language generation (NLG) software system that generates rich, content-sensitive human language descriptions based on unparsed raw domain-specific data. In one embodiment, the NLG software system may include a data parser/normalizer, a comparator, a language engine, and a document generator. The data parser/normalizer may be configured to retrieve specification information for items to be described by the NLG software system, to extract pertinent information from the raw specification information, and to convert and normalize the extracted information so that the items may be compared specification by specification. The comparator may be configured to use the normalized data from the data parser/normalizer to compare the specifications of the items using comparison functions and interpretation rules to determine outcomes of the comparisons. The language engine may be configured to cycle through all or a subset of the normalized specification information, to retrieve all sentence templates associated with each of the item specifications, to call the comparator to compute or retrieve the results of the comparisons between the item specifications, and to recursively generate every possible syntactically legal sentence associated with the specifications based on the retrieved sentence templates. The document generator may be configured to select one or more discourse models having instructions regarding the selection, organization and modification of the generated sentences, and to apply the instructions of the discourse model to the generated sentences to generate a natural language description of the selected items.

19 Claims, 6 Drawing Sheets

U.S. PATENT DOCUMENTS

| | | | |
|---|---|---|---|
| 7,194,405 B2 * | 3/2007 | Tavor .................................. | 704/9 |
| 7,418,447 B2 * | 8/2008 | Caldwell et al. ............. | 705/26.1 |
| 7,555,490 B1 * | 6/2009 | Neal ............................ | 707/102 |
| 7,735,012 B2 * | 6/2010 | Naik ............................. | 715/727 |
| 7,783,528 B2 * | 8/2010 | Musgrove et al. ........... | 705/26.1 |
| 2002/0116171 A1 * | 8/2002 | Russell ............................ | 704/4 |
| 2002/0116173 A1 * | 8/2002 | Ratnaparkhi .................... | 704/9 |
| 2003/0061209 A1 * | 3/2003 | Raboczi et al. ................... | 707/3 |
| 2005/0267871 A1 * | 12/2005 | Marchisio et al. ................ | 707/3 |
| 2006/0015324 A1 * | 1/2006 | Pan et al. ........................... | 704/9 |

* cited by examiner

METHODS AND SYSTEMS FOR GENERATING NATURAL LANGUAGE DESCRIPTIONS FROM DATA

REFERENCE TO RELATED APPLICATION

This application claims priority from Provisional Application Ser. No. 60/644,438, filed on Jan. 14, 2005, which is expressly incorporated by reference herein.

DESCRIPTION OF THE RELATED ART

Data-to-Speech (DTS) generally refers to any system that converts structured data into human language, regardless of whether its output is written, spoken, or otherwise delivered. Existing DTS software systems generally have limitations that may affect their applicability in differing environments or contexts to generate human language text in a format desired by the users. Some DTS systems, such as GoalGetter and D2S, are highly specific to a single domain or subject matter, and may not be easily adapted for use with other subject matters. Such domain-specificity is present in the GoalGetter system that generates descriptions of soccer games in Dutch. This is also an example of a system that is limited to generating text and/or speech in one language. Further, in most template-based systems, the DTS software is only capable of generating a finite number of distinct sentences dependent on the number of templates provided in the DTS software. Moreover, many existing DTS systems typically generate text and/or speech with a fixed structure, such as detailing events in chronological order. Therefore, a need exists for a DTS system that overcomes the limitations of domain-specificity, language-specificity, finiteness and fixed structure.

In addition, existing DTS systems typically limit user intervention to the selection of a single item or event to be described, and provide an objective factual description of the selected item or event (e.g., a summary of the events in a soccer game, such as goals, fouls, players' actions, and the like). Consequently, a need also exists for a DTS system that may allow users to select any number of items to be described and/or compared, and to specify the user's own preferences as to how the items' information should be evaluated in relation to one another, to provide highly varied descriptions and/or comparisons based on the user's choices and preferences.

In retail commerce, many vendors, whether they are brick-and-mortar retailers, catalog distributors, E-commerce providers with retail websites, and the like, offer a wide variety of goods for sale to their customers. In many instances, the vendors offer the same product or type of product in many different models from many different manufacturers, thereby providing the customer with numerous options such that the customer may select the particular product that most closely satisfies their needs and preferences. Such products include consumer electronics devices, computers and peripheral devices, large and small appliances, automobiles, motorcycles, furniture and the like. Each product or type of product has associated specifications that serve to define the product and provide a basis for evaluating the product against other similar products that may be purchased by the consumer. Despite the availability of the product specifications for use in the education of the consumer about the product and comparison to similar products, consumers may not be able to efficiently process the information in a manner that allows the consumer to be fully informed about the product and to meaningfully compare similar products and draw meaningful distinctions, especially in areas where the consumer is relatively unsophisticated.

Various sources exist that provide descriptions and comparisons for products to assist consumers in their purchasing decisions. Of course, the product manufacturers provide descriptions of their products that may include comparisons to comparable products offered by themselves and other manufacturers. As these are sales aids, the descriptions will be written in a manner to persuade the consumer to purchase the product, and generally will only include comparisons tending to show the superiority of the product over other products. Consumer Reports is a source for product reviews and ratings of consumer products based on testing performed on the products, and may include comparisons, both favorable and unfavorable, to comparable products based on the results of the testing. While this information is less biased than that provided by the manufacturer, it may be limited to the extent that only a limited number of comparable products may be included in the testing, and that the particular test performed on the products and reported when the reviews are drafted may not include all the information about the product that may be relevant to the consumer in making their purchasing decisions. Still further, in the area of automobiles, services such as Edmunds provide reviews of automobiles that may be viewed on-line or purchased and downloaded. These may include professionally written vehicle reviews, but the reviews are limited to only those vehicles that actually had an editor sit in, drive and live with the reviewed vehicles, and typically do not include comparisons to other vehicles.

With so many different options available for these types of consumer products, it is not feasible for a product reviewing source, let alone an individual consumer, to perform comparisons that are meaningful to the consumers of the specifications of each product to the specifications of each comparable product and generate a textual description of the comparison. Therefore, a need also exists for a system for generating natural language descriptions and comparisons of items within a domain, such as similar products, services, fields of endeavor, and the like, based on specification data for the items such that the descriptions and comparisons may be generated for any desired combination of the items within the domain.

SUMMARY

The invention is directed to a natural language generation (NLG) software system that generates rich, content-sensitive human language descriptions based on unparsed raw domain-specific data. In one embodiment, the NLG software system may include a data parser/normalizer, a comparator, a language engine, and a document generator. The data parser/normalizer may be configured to retrieve specification information for items to be described by the NLG software system, to extract pertinent information from the raw specification information, and to convert and normalize the extracted information so that the items may be compared specification by specification. The comparator may be configured to use the normalized data from the data parser/normalizer to compare the specifications of the items using comparison functions and interpretation rules to determine outcomes of the comparisons. The language engine may be configured to cycle through all or a subset of the normalized specification information, to retrieve all sentence templates associated with each of the item specifications, to call the comparator to compute or retrieve the results of the comparisons between the item specifications, and to recursively generate every possible syntactically legal sentence associated with the specifications based on the retrieved sentence templates. The document generator may be configured to select one or more discourse models having instructions regarding the selection, organization and modification of the generated sentences, and to apply the instructions of the discourse model to the generated sentences to generate a natural language description of the selected items.

In one aspect, the invention is directed to a method for generating a natural language description of a user-selected item comparing the user-selected item to at least one comparison item, wherein the characteristics of each item are defined by a plurality of specifications. The method may include retrieving the specifications for the user-selected item and the at least one comparison item from a storage medium, and comparing the specifications for the user-selected item to the specifications for the at least one comparison item. The method may further include generating a plurality of natural language sentences describing the user-selected item, wherein the text of the natural language sentences is determined based on the outcome of the comparisons of the specifications of the user-selected item to the specifications of the at least one comparison item, and combining the generated natural language sentences into a natural language document describing the user-selected item.

In another aspect, the invention is directed to an apparatus structured to generate a natural language description of a user-selected item comparing the user-selected item to at least one comparison item, wherein the characteristics of each item are defined by a plurality of specifications. The apparatus may include a processing unit and a memory device operatively coupled to the processing unit. The memory device may store a software program structured to cause the processing unit to retrieve the specifications for the user-selected item and the at least one comparison item from one of the memory device and a storage medium operatively coupled to the processing unit, and to compare the specifications for the user-selected item to the specifications for the at least one comparison item. The software program may further be structured to generate a plurality of natural language sentences describing the user-selected item, wherein the text of the natural language sentences is determined based on the outcome of the comparisons of the specifications of the user-selected item to the specifications of the at least one comparison item, and to combine the generated natural language sentences into a natural language document describing the user-selected item.

In a further aspect, the invention is directed to a computer readable medium, storing a software program structured to cause a server to retrieve a plurality of specifications for a user-selected item and for at least one comparison item from a storage medium, wherein the characteristics of each item are defined by the plurality of specifications, and to compare the specifications for the user-selected item to the specifications for the at least one comparison item. The software program may further be structured to generate a plurality of natural language sentences describing the user-selected item, wherein the text of the natural language sentences is determined based on the outcome of the comparisons of the specifications of the user-selected item to the specifications of the at least one comparison item, and to combine the generated natural language sentences into a natural language document having a natural language description of the user-selected item comparing the user-selected item to the at least one comparison item.

In yet another aspect, the invention is directed to a natural language generation system for generating a natural language description of a user-selected item comparing the user-selected item to at least one comparison item, wherein the characteristics of each item are defined by a plurality of specifications. The system may include a data parser/normalizer configured to retrieve the specifications for the user-selected item and the at least one comparison item from a storage medium, and a comparator configured to compare the specifications for the user-selected item to the specifications for the at least one comparison item. The system may further include a language engine configured to generate a plurality of natural language sentences describing the user-selected item, wherein the text of the natural language sentences is determined based on the outcome of the comparisons by the comparator of the specifications of the user-selected item to the specifications of the at least one comparison item, and a document generator configured to combine the natural language sentences generated by the language engine into a natural language document describing the user-selected item.

DETAILED DESCRIPTION

Figure 1:
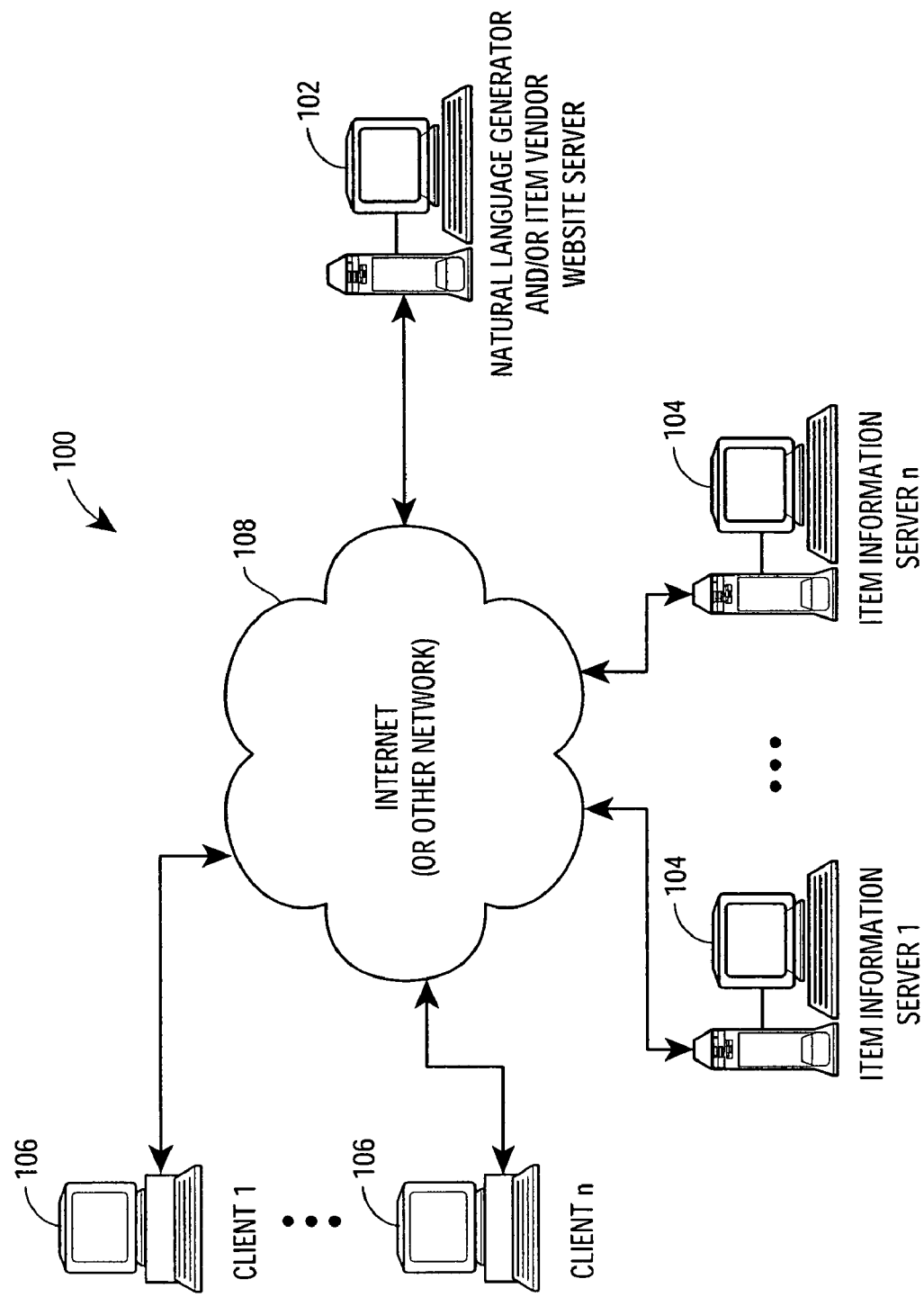
FIG. 1 is a high level block diagram of a communication system illustrating an exemplary environment of use for a natural language generator in accordance with the invention.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

In general, the system described herein is a natural language generation (NLG) software system that generates rich, context-sensitive human language descriptions of items based on unparsed raw domain-specific data for the item and for items to which the selected item is compared. The system can be applied to any domain comprised of structured data describing and defining items and retrievable from some source, such as a computer database. The NLG software system's output is based on a set of syntactically- and semantically-rich abstract representations and a detailed discourse model or models that enable the generation of highly varied context-sensitive text depending on the items selected for the comparison. For example, in one application the NLG software system may be implemented to generate textual descriptions based on technical automotive data to help non-specialists understand the technical automotive data more easily and to guide the potential vehicle purchasers in their car-buying decisions. The underlying abstract representations are recursive, thereby making the NLG software system capable of producing an infinite number of distinct syntactically correct sentences describing the selected item and the items to which the selected item is compared.

The NLG software system may be implemented on various differing hardware platforms and in various differing network configurations allowing the system to receive input from operators or users to configure the system with abstract representations necessary to generate the desired text and to select the items to be used by the system in generating the text, to acquire the domain-specific data for the selected items to be used by the system, to execute the functionality of the system to generate text, and to output the generated text in the desired medium at the desired locations. In the following illustrative example of an implementation of the NLG software system in a networked environment, the NLG software system is shown as being implemented at a server connected to the Internet or other network such that the NLG software may obtain data at the server on which it is implemented and from remote servers via the communication network. Further, the NLG software may be accessed locally using input devices at the server or remotely by client devices via the communication network to perform configuration and selection functions necessary for the NLG software to generate the desired text. Still further, the NLG software may be accessed locally or remotely to output the generated text locally or at remote output devices as desired. Those skilled in the art will understand that the NLG software system in accordance with the invention may be implemented in other configurations of networked devices, or in standalone devices, and configured to generate the desired text in real time or in batch operations depending on the requirements of the particular implementation.

A high level block diagram of an exemplary network communications system 100 capable of implementing an NLG software system in accordance with the invention is illustrated in FIG. 1. Typically, the system 100 may include one or more natural language generator servers 102, one or more item information servers 104, and one or more client devices 106. Each of these devices may communicate with each other via a connection to the Internet or some other wide area network 108. The network 108 may be any type of network, such as a local area network (LAN) and/or the Internet. As illustrated in FIG. 1, the natural language generator server 102 may also be a commercial or informational content server such as, for example, a vehicle vendor server, that may output text generated by the NLG software system along with other information in formatted web pages or other formatted files to the client devices 106 in response to requests from the client devices 106. Further, in such a networked implementation, the NLG server 102 may store a plurality of files, programs, and/or web pages for use by the client devices 106, and the NLG server 102 may handle requests from a large number of clients 106. Accordingly, the NLG server 102 may typically be a high end computer with a large storage capacity, and/or access to external storage media, one or more fast microprocessors, and one or more high speed network connections. Conversely, relative to the NLG server 102, the client devices 106 may typically include less storage capacity, a single microprocessor, and a single network connection.

Figure 2:
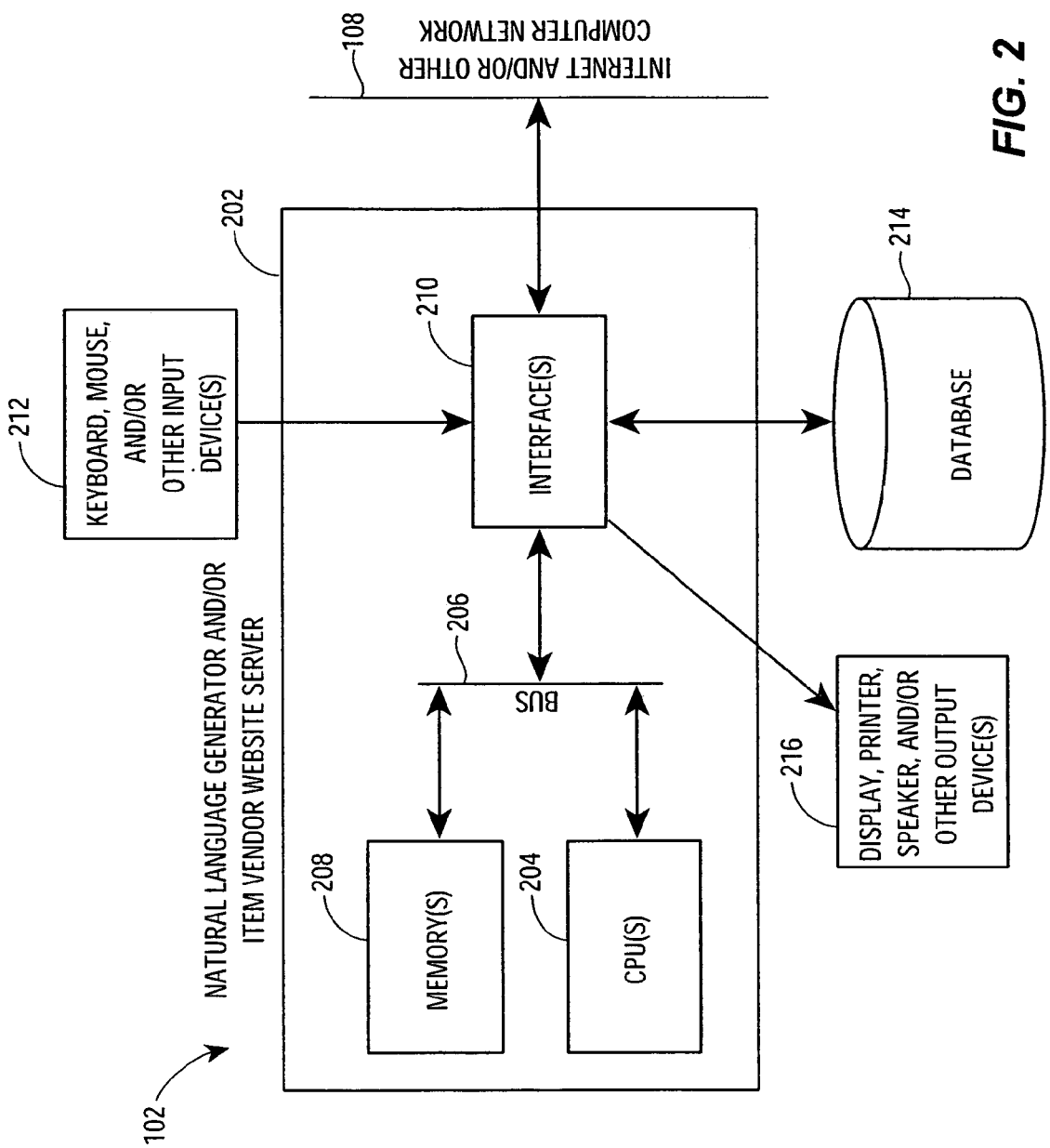
FIG. 2 is a more detailed block diagram showing one embodiment of the natural language generator and/or item vendor website server illustrated in FIG. 1.

A more detailed block diagram of a NLG server 102 is illustrated in FIG. 2. The NLG server 102 may include a controller 202 that may include a central processing unit 204 electrically coupled by an address/data bus 206 to a memory device 208 and an interface circuit 210. The CPU 204 may be any type of well known CPU, such as an Intel Pentium™ processor. The memory device 208 may include volatile memory and non-volatile memory, and may store a software program or programs implementing the NLG software system in accordance with the invention, and that interact with the item information servers 104 and client devices 106 as described below. The programs may be executed by the CPU 204 in a well known manner. The memory device 208 may also store digital data indicative of documents, files, programs, web pages, etc. retrieved from a server 104, client device 106 or other devices communicatively linked to the network 108 and/or loaded via an input device 212 or external storage device, such as database 214. To facilitate communications with the database 214, the interface 210 may include an appropriate database interface module.

The interface circuit 210 may be implemented using any type of well known interface standard, such as an Ethernet interface and/or a Universal Serial Bus (USB) interface. One or more input devices 212 may be connected to the interface circuit 210 for entering data and commands into the controller 202. For example, the input devices 212 may include a keyboard, mouse, touch screen, track pad, track ball, isopoint, a voice recognition system and the like. One or more output devices 216 may also be connected to the controller 202 via the interface circuit 210. The output devices 216 may include video and/or visual display devices, such as cathode ray tubes (CRTs), liquid crystal displays (LCDs), printers or any other type of video and/or visual display device. The output devices 216 may further include audio output devices such as speakers, voice or sound synthesizers and the like. In order to operate the output devices 216, the memory 208 and/or the interface 210 may be programmed with the necessary software or drivers to cause the output devices 216 to output the desired content.

The interface 210 may also include a connection to the network 108 to allow the NLG server 102 to exchange data with other devices connected to the network 108 in any appropriate manner known to those skilled in the art. Communications over the network may be facilitated by network receiver and network transmitter modules of the interface 210. Further, in implementations where the NLG server 102 provides web pages to requesting client devices 106 containing content generated by the NLG software system, the interface 210 may further include a web page generator module to cause the network transmitter to transmit web pages containing the requested content and, if necessary, dynamically generate the web pages in response to each request or to changes in the content, such as when the natural language text is regenerated by the system.

Figure 3:
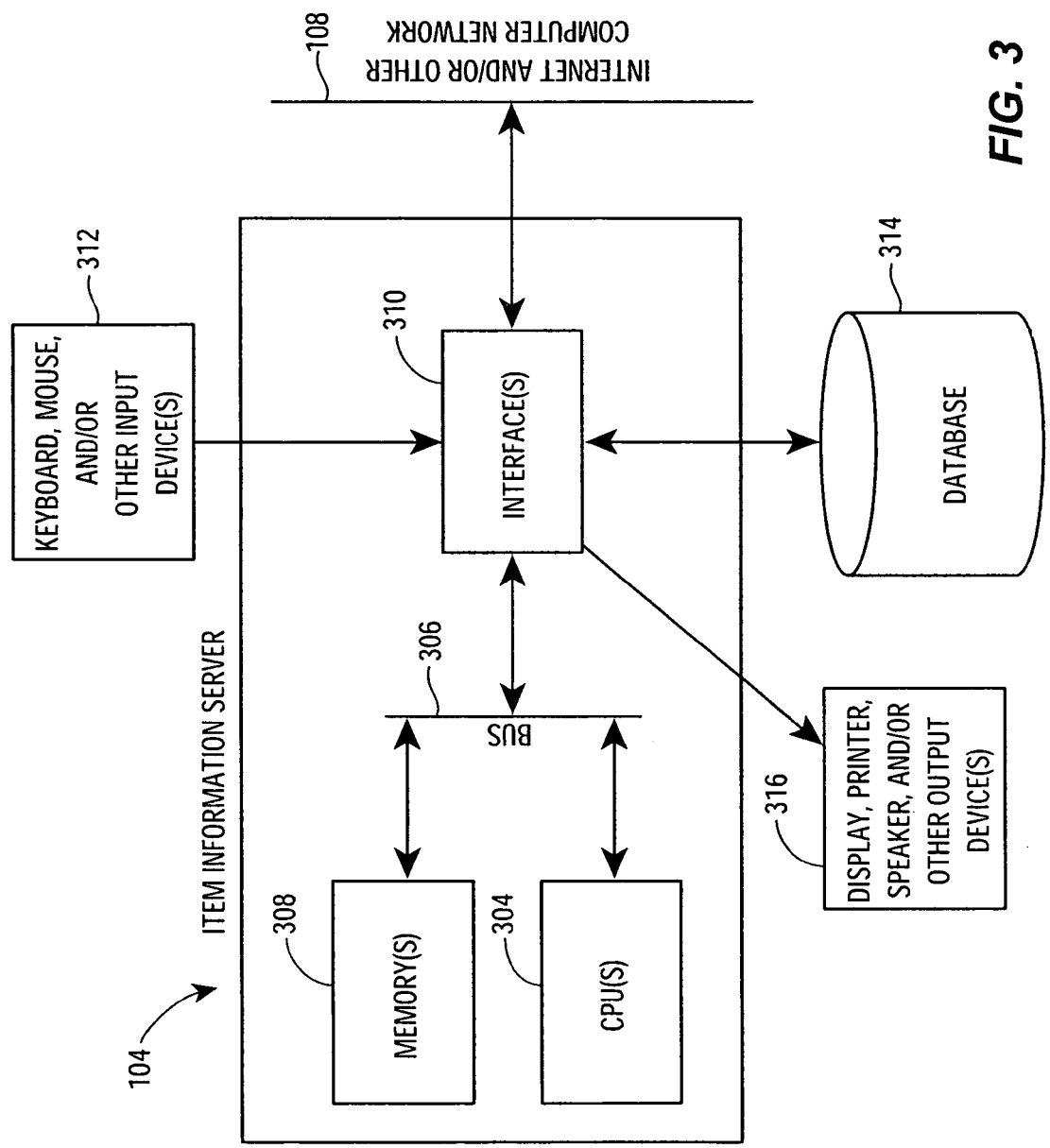
FIG. 3 is a more detailed block diagram showing one embodiment of the item information servers illustrated in FIG. 1.

A more detailed block diagram of an item information server 104 is illustrated in FIG. 3. Like the NLG server 102, the controller 302 of the item information server 104 may include a central processing unit 304 electrically coupled by an address/data bus 306 to a memory device 308 and a network interface circuit 310. The CPU 304 may be any type of well known CPU, such as an Intel Pentium™ processor, and the memory device 308 may include volatile memory and non-volatile memory. The memory device 308 may store software programs that implement functionality required by the provider of the item information stored at the item information server 104 and provided to other devices connected to the network 108, such as the NLG servers 102. These programs may be executed by the CPU 304 in a well known manner. The memory device 308 and/or a separate database 314 that may be connected to an interface 310 of the item information server 104 may also store other files, programs, web pages, etc. that may be transmitted to or received from other devices connected to the network 108, such as the NLG servers 102 and client devices 106. The server 104 may exchange such data with other devices via a connection to the network 108. The network interface circuit 310 may be implemented using any data transceiver, such as an Ethernet transceiver. Additionally, the item information servers 104 may include input devices 312 and output devices 316, such as those described above, connected to the item information servers 104 at the interface 310.

Figure 4:
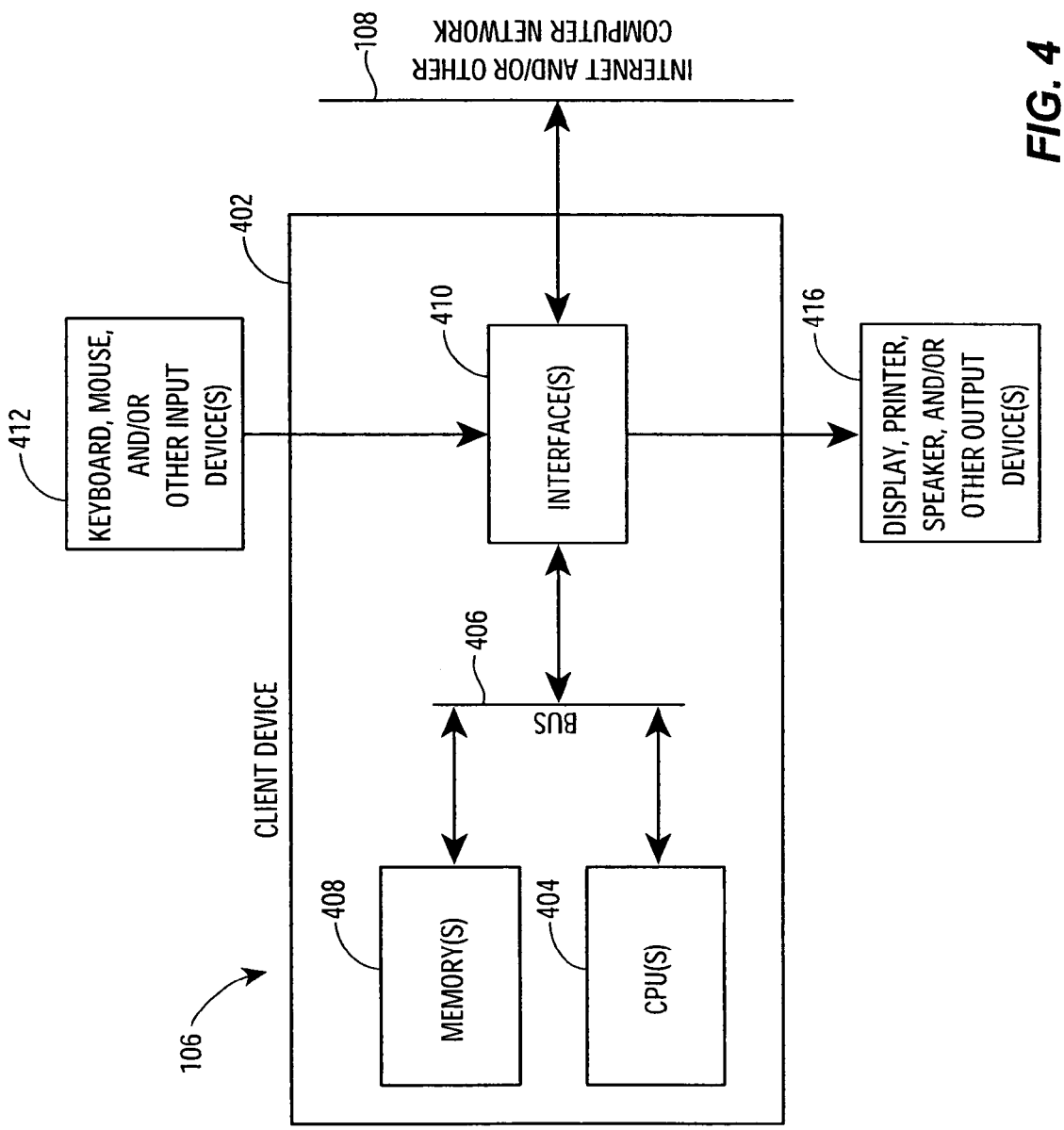
FIG. 4 is a more detailed block diagram showing one embodiment of the client device illustrated in FIG. 1.

A more detailed block diagram of a client device 106 is illustrated in FIG. 4. The client device 106 may be a personal computer (PC), a personal digital assistant (PDA), an Internet appliance, a cellular telephone, or any other communication device. Like the NLG server 102 and item information server 104, the controller 402 in the client device 106 may include a central processing unit 404 electrically coupled by an address/data bus 406 to a memory device 408 and a network interface circuit 310. The client device controller 402 may not be as powerful as the NLG and item information server controllers 202, 302, respectively. However, the CPU 404 may be any type of well known CPU, such as a version of the Intel Pentium™ processor, and the memory device 408 may include volatile memory and non-volatile memory. The memory device 308 may store a software program allowing the client device 106 to communicate with other devices on the network 108 via a connection of an interface 410 to the network 108. This program may be executed by the CPU 404 in a well known manner. The memory device 408 and/or a separate database 414 that may be connected to an interface 410 of the client device 106 may also store other files, programs, web pages, etc. that may be transmitted to or received from other devices connected to the network 108, such as the NLG servers 102 and item information servers 106. The client device 106 may exchange such data with other devices via a connection to the network 108. The network interface circuit 410 may be implemented using any data transceiver, such as an Ethernet transceiver. Additionally, the client devices 106 may include input devices 412 and output devices 416, such as those described above, connected to the client devices 106 at the interface 410.

One particular implementation of the NLG software system is in creating comparative descriptions of user-selected items based on comparisons to other comparable items. As used herein, an item is any top-level object in a specified domain. For example, a particular make and model of a vehicle is an item in the automotive domain, or a particular computer system, such as Dell Inspiron 8200 laptop computer, is an item in the computer equipment domain. A specification is a discrete characteristic of the items in the domain, and each item is defined in terms of its value for each specification, or a subset of specifications. Consequently, price, top speed, and leg room are specifications defining items in the automotive domain. A specification may be, but need not be, numerical or objective, and can be a recursive composite made up of other specifications.

Figure 5:
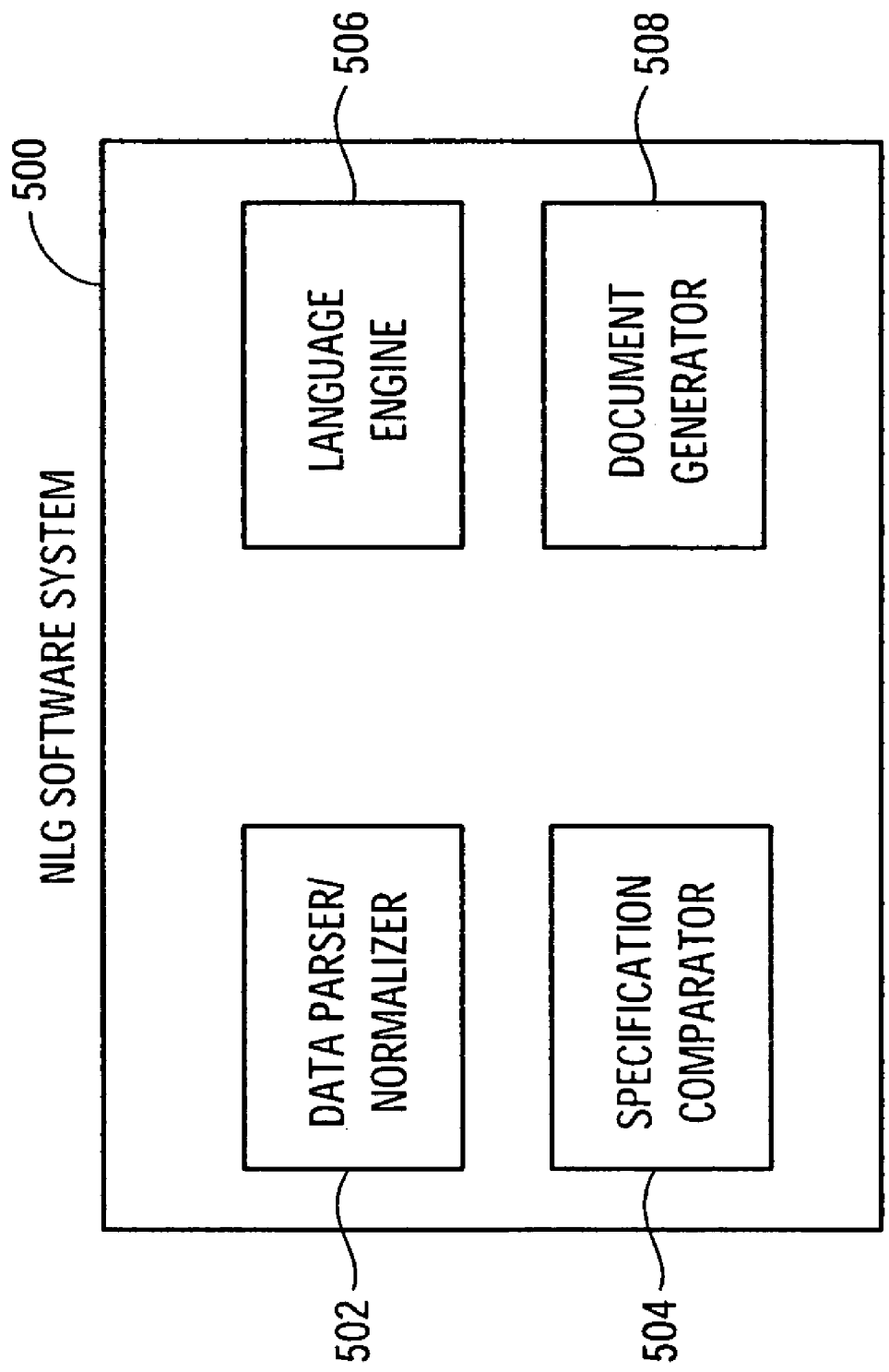
FIG. 5 is a block diagram of the components of a natural language generation software system in accordance with the invention.

FIG. 5 is a block diagram of the components of an embodiment of an NLG software system 500 in accordance with the invention. The NLG software system 500 may be implemented, for example, at an NLG server 102 of the system 100, and stored in the memory 208 or in an external storage device attached thereto. The NLG software system 500 may include separate modules for performing distinct functions of the system 500, and may include a data parser/normalizer 502, a specification comparator 504, a language engine 506 and a document generator 508. While the components 502-508 are illustrated as being distinct components of the system 500, those skilled in the art will understand that the functionality of the components 502-508 may be implemented in any desired manner wherein the NLG software system 500 generates natural language text as described herein. For example, the components 502-508 may be distinct computer programs that are accessed when necessary during the natural language text generation process by a main control program of the system 500 or a batch processing scheduling program. Alternatively, the components 502-508 may be separate portions or modules within a single program of the NLG software system 500. Other configurations of the components 502-508 and the NLG software system 500 to implement the natural language text generation functionality of the system 500 will be apparent to those skilled in the art and are contemplated by the inventor as having use in systems in accordance with the invention.

The data parser/normalizer 502 of the system 500 retrieves specification information for the user-selected item and the comparison item or items from a database or other data source stored in a storage medium such as the memory 208, databases 214, 314, extracts the relevant information relating to the specification values from the retrieved information and, if necessary, reformats the specification value information in a manner that makes the information usable for comparing the user-selected item to the comparison item(s). The data parser/normalizer 502 is a data abstraction layer configured to extract the relevant specification values from the retrieved information. For example one source of information may be a database of information for the items within the relevant domain that may be stored at the database 214 of the NLG server 102 or retrieved over the network 108 from one of the item information servers 104. One example of such a database is a vehicle specifications database provided by a service such as Edmunds that may allow a customer to download the database to their local computer or to log in to the service's server to retrieve information from a database residing at the service's server. Where a database or data file having a known format is used as a source from item information, the data parser/normalizer 502 may be configured to read records from the database or file for the relevant items and to extract the necessary specification information from the known locations within the retrieved records. Of course, the data parser/normalizer 502 may be configured to extract the necessary information from any other type of input format in which the information is available, such as item specification sheets that have been scanned and processed with optical character recognition software to generate a text files, other formats of text files or word processing documents and the like.

The extraction of the specification values by the data parser/normalizer 502 may also include the separation of the values from associated or extraneous data that may accompany the values when retrieved from the information source. For example, a length measurement may be stored as textual data instead of numeric data in a database or data file and include the number representing the length and the units (e.g., "72 in."). In this case, the data parser/normalizer 502 may be configured to remove the unit designation "in." and store the number representation of the length as numeric data. As another example, the specifications for a vehicle tire may exist in the information source in the industry standard tire designation format for identifying the tire specifications, such as "265/60R18," where "265" represents the tread width of the tire in millimeters, "60" represents the tire's aspect ratio, and "18" represents the rim diameter of the tire in inches. In order to extract the necessary tire specification values, the data parser/normalizer 502 may be configured to interpret the first three digits of the tire designation to be the tread width, the two digits following the slash to be the aspect ratio, and the last two digits to be the rim diameter. Similar extraction methods may be configured in the data parser/normalizer 502 as necessary in any manner known in the art.

The extraction of the specification values occurring at the data parser/normalizer 502 may further include the normalization of the extracted values to a uniform format to allow proper and meaningful comparison of the values when evaluating the items. For example, a unit conversion may be necessary where the specification values for different items are retrieved from different sources where one source provides information based on the metric system and the other source uses the English system of units. Further, where a user elects to have a description generated of a comparison of a single item to multiple comparison items, the normalization performed by the data parser/normalizer 502 may include the merger of the specification information for the comparison items into a single composite virtual comparison item. For example, where a user-selected vehicle is being compared to a class of vehicles or to a user-defined group of vehicles, the specification values for each specification for the comparison vehicles may be combined into a composite specification for use in the comparison. The data parser/normalizer 502 may be configured to merge each of the specifications from the comparison vehicles in a manner relevant to the comparisons to be performed while generating the document. Depending on the items, the specifications and the comparisons to be performed, the merger of the specifications may be as simple as calculating an average of the specification values of the comparison items, or more detailed and require the determination of a number of pieces of information for a single specification. For example, the specification for the MSRP of a vehicle may require the calculation of the maximum price, the minimum price, the average and median prices, and any other implementation defined custom functions. Moreover, non-numeric specifications, such as brake systems (ABS, non-ABS, etc.) and interiors (leather, cloth, etc.), may be merged in other ways to yield the desired specification information, such as calculating the percentage of vehicles within the comparison group having each of the possible values of the non-numeric specifications. As the data parser/normalizer 502 extracts the information and determines the values of the specifications to be used in generating the natural language descriptions, the normalized or post-process specifications are stored for later use by the other components of the NLG software system 500.

The comparator 504 of the NLG software system 500 is configured to use the normalized specification values to compare the attributes of the user-selected item to the comparison item (either actual or a composite virtual item). Each specification for the item is associated with one or more comparison functions as well as default and/or user-defined interpretation rules. The comparison of the user-selected item and the comparison item can be effected by cycling through the specifications, computing the output of each specification's comparison functions using each item's normalized value for that specification and the specification's interpretation rules, and storing the outcomes of the comparisons for later use in generating sentences expressing the result of this comparison in natural language. Alternatively, the comparator 504 may be accessed by another component, such as the language engine 506, to perform the necessary comparisons as needed, such as when a phrase of a sentence template requires a specification comparison to be performed.

The default and/or user-definable interpretation rules assign a particular value to the result of a comparison function, and the comparison between two values may yield different comparison results based on the specifications being compared and the interpretation rules being used to interpret the results of the comparison function, even where the same numerical values are being compared by the same comparison function. As a result, the comparison of the numbers "185" and "175" to determine which vehicle is better may yield different outcomes where the numbers represent the vehicles' top speed in miles per hour versus where the numbers represent the vehicles' MSRP in thousands of dollars. Still further, the comparison functions and interpretation rules may take into account relative values of the compared specifications such as, for example, where one vehicles' top speed is considered to be better or worse than another vehicles' top speed only if the top speed is at least 5.00% higher or lower than the comparison vehicle, otherwise the vehicles are considered to be neutral or just as good with respect to the top speed specification.

As previously discussed, the specifications may have numeric, textual or alphanumeric values, and the comparison functions and interpretation rules may be configured to allow for the type of specification and value being evaluated and to determine outcomes in the manner desired by the user setting up the system 500. For example, in the vehicle domain, a comparison function for the specification "seating materials" may include an interpretation rule indicating a preference for leather or cloth seats. In an implementation where leather is preferred, the interpretation rule for "seating materials" may be an abstract representation of the concept "leather seats are better than cloth seats" such that the outcome of the comparison is a data representation of "preferred," "worse" or "neutral" depending on the seating materials used in the compared vehicles. Similarly, if cloth is preferred, the comparator 504 may be configured with the abstract representation of the concept "cloth seats are better than leather seats" for the comparison of the "seating materials" specification. As illustrated by this example, the same comparison function used to compare various items' values for any specification may yield different results for comparator 504 configurations with different interpretation rules for the output of the comparison function associated with that specification. Each comparison function outputs a result for the associated specification that may be used subsequently by the system 500 to generate sentences reflective of the outcomes of the comparison functions.

The language engine 506 takes the normalized specification values for the items produced by the data parser/normalizer 502 and the comparison results produced by the comparator 504, and recursively generates syntactically legal sentences associated with each of the specifications for the items. Each generated sentence explicates the results of one or more of the comparison functions in natural language. The system 500 is configured with one or more sentence templates for each specification of the items so that multiple sentences may be generated for each specification if desired by the user. The sentence templates contain a combination of invariant text and coded phrases written in a particular syntax that the language engine 506 is configured to interpret in order to generate sentences according to the coding in the phrases and the values of the item specifications associated with the sentence template. One embodiment of syntax strategy that may be implemented in the sentence templates and interpreted by the language engine 506 is discussed further below.

In their simplest form, the sentence templates may be configured to generate sentences stating the value of a specification for the user-selected item such as, "The Ford Explorer has a top speed of 185 miles per hour." More complex sentence templates may utilize both the values of the corresponding specification and the outcome determined by a comparison function and interpretation rule for the specification at the comparator 504, with different sentences being generated from the same template based on the outcome of the comparison. As a result, a sentence template for the specification of a vehicle's interior dimensions and a comparison function to determine which vehicle has larger interior dimensions my result in the sentences, "The ample interior dimensions of Alero make it much roomier for your passengers than Taurus," "The interior dimensions of Alero make it less roomy for your passengers than Taurus," and "The interior dimensions of Alero make it just as roomy for your passengers than Taurus," where the Alero's interior dimensions are larger than, smaller than or comparable to, respectively, the Taurus.

In some instances, it may be desired to generate sentences depending on the values and comparison function outcomes of multiple specifications. To account for such conditions, the language engine 506 may be configured to evaluate the relevant specifications and to generate a sentence from a particular sentence template if the evaluation conditions are satisfied. When such a multiple-specification comparison is set up for one or more sentence templates, a meta-rule may be defined for the sentence template(s) to evaluate the comparison results according to specified evaluation conditions, and to guide the sentence generation process for a given specification in reference to another specification or group of specifications. Meta-rules can be used to guide linguistic output when two or more specifications are not independent of each other, such as a vehicle's top speed and its gross-weight. For example, a meta-rule may be defined that evaluates the comparisons of the vehicles' top speeds and gross weights and determines which of two alternative sentence templates to use, or that no sentence will be generated at all. In this case, an evaluation condition of a meta-rule may be configured representing the following:

if i1.s1>i2.s1 and i1.s2>i2.s2, use t1;
else if i1.s1>i2.s1 and i1.s2<=i2.s2, use t2;
else continue
Where:
i1, i2=vehicle 1, vehicle 2;
s1, s2=specification 1, specification 2;
t1, t1=template 1, template 2; and
"ix.sy" denotes the value of specification y for item x According to this rule where specification 1 is the top speed and specification 2 is gross weight, the language engine 506 will generate a sentence from the first template if the first vehicle if faster and heavier than the second vehicle (e.g., "Vehicle X reaches faster top speeds than vehicle Y, in spite of its heavier gross weight."), will generate a sentence from the second template if the first vehicle is faster than but lighter or the same weight as the second vehicle (e.g., "Vehicle X reaches faster top speeds than vehicle Y, partly thanks to its lighter weight."), and will not generate a sentence if the first vehicle is slower than the second vehicle. Other meta-rules involving any number of specifications and evaluation criteria may be configured along with the corresponding sentence template(s) in order to generate the desired sentences in a particular implementation of the NLG software system 500.

Meta-rules can also be used to guide sentence generation of an arbitrary number of specifications which may or may not be dependent on each other. For example, a meta-rule may be defined that evaluates the comparisons of the vehicles' top speeds and retail price, and determines whether a vehicle's top speed can be explicated with relation to the vehicle's retail price. For example, a meta-rule may be defined such that where the top speed is a specified percentage higher than the top speed of the actual or virtual comparison item and the retail price is less than or equal to the retail price of the comparison item, the language engine 506 may generate the sentence, "With respect to top speed, you get a lot for your money with the Alero."

After the language engine 506 cycles through all the sentence templates for all the specifications for the item, the language engine 506 will have generated and stored all of the sentences that may potentially be used in a generated document describing the user-selected item. Once the sentences are generated, the document generator 508 takes the generated sentences and selects the particular sentences to be used in the description and arranges the sentence in the manner specified by a user. In order to arrange and string together the sentences into the desired textual descriptions, the document generator 508 may be programmed with one or more discourse models having instructions or rules causing the document generator 508 to select a subset of the fully-formed sentences output by the language engine 506 to build a natural language document detailing the comparison between the user-selected items. The discourse model may further include knowledge-tracking system functionality to perform content-editing functions, pronoun/synonym selection, anaphora resolution, and like functions to make the text read more like natural language than the strung together computer generated sentences. The output text compiled by the document generator 508 may then be stored in a document database for later retrieval, or displayed in various ways, including but not limited to printed documents, web pages, audio recordings (if interfaced with a text-to-speech converter), and the like.

As noted above, the document generator 508 may be configured with multiple discourse models that may use the same sentences generated by language engine 506 for the user-selected item and compile different versions of the item description based on the purpose or audience of the comparison description. Consequently, if it is desired to generate a document with minimal repetition, a discourse model may be configured in a manner to exclude most of the generated sentences and include only the essential sentences required to describe the outcome of the item comparison. The discourse model may also be configured to control the style of the document, such as between the use of formal and casual speech. For instance, a give specification may have two associated sentence templates expressing the outcome of the same comparison function, with one template containing more formal vocabulary and the other containing more casual vocabulary. Sentences may be generated by the language engine 506 for both templates, but the discourse model may be configured to choose the generated sentence having the style consistent with the style of the document being generated. The discourse model may be configured to group related specifications and to present the specifications in the order of importance to the target audience. Consequently, a discourse model for a comparison of compact economy cars may group price-related, fuel economy and safety features together for discussion at the beginning of the description, whereas a discourse model for a comparison of sports cars may have a grouping of performance-related specifications that will be positioned prominently in the item description.

Figure 6:
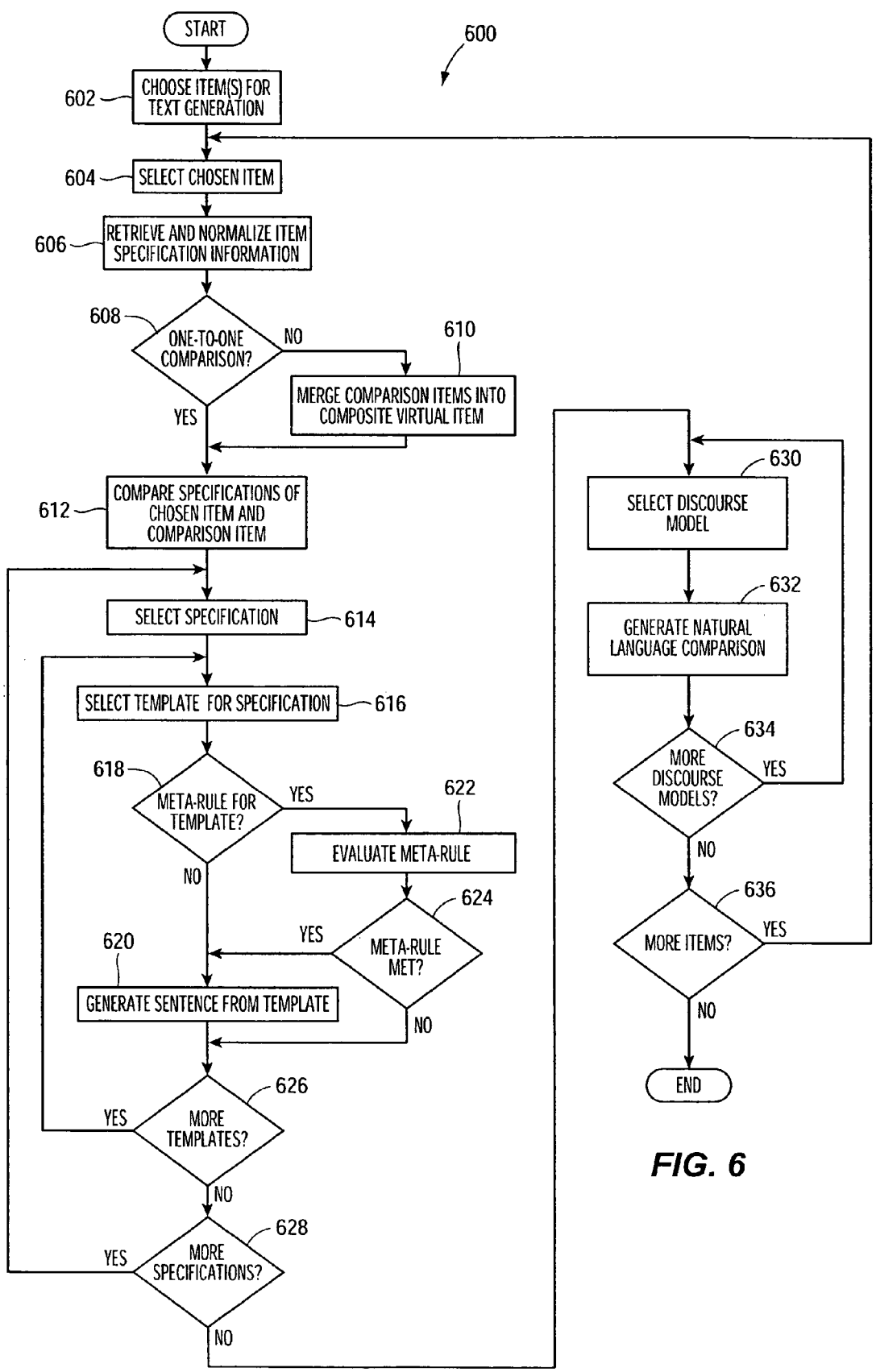
FIG. 6 is a flow diagram of a natural language comparative item description generation routine that may be implemented in the natural language generation software system of FIG. 5.

The components 502-508 of the NLG software system 500 may operate together to generate the desired natural language description or descriptions of items within the subject domain. FIG. 6 illustrates one embodiment of a natural language description routine 600 wherein the system 500 generates one or more natural language descriptions for one or more user-selected items of the domain. The routine 600 may begin at a block 602 wherein a user may select one or more of the available items within the domain for which the user desires to generate a natural language description or descriptions. In one embodiment, the NLG software system 500 may provide a user interface at the NLG server 102 allowing an operator to select the items from a list of items available for text generation. For example, where the domain is automobiles, the user interface may allow the user to choose one or more make and models of automobiles for which text will be generated, either individually or in groups, such as by vehicle class. In addition to selecting the vehicles to be described, the user interface may allow the user to select one or more vehicles, if any, to which the vehicle may be compared for purposes of generating the description of the vehicle. The user may select no comparison vehicles, in which case either no comparisons will be made or a default group of vehicles, such as other vehicles within the selected vehicles' class, will be used in a comparison. Still further, the user interface may allow the user to select a desired type or types of descriptions to be generated where the system 500 is configured with multiple discourse models.

In an alternate embodiment, the NLG server 102 may be an item vendor server providing a website for customers to view and purchase items, such as automobiles. In this embodiment, the website may be configured to provide a webpage allowing a customer accessing the website via one of the client devices 106 to select one of the items available through the website, and have the website/server 102 generate and display a description of the item comparing the item to one or more similar items. The webpage may provide similar options for the user as described above, such as selection of the items for the comparison and the type of description to be generated. Once the desired selections are made by the user, the input information may be transmitted from the client device 106 over the network 108 to the server 102 for generation of the requested description. Those skilled in the art will understand that other user interfaces and mechanisms for inputting selections regarding an item or items to be described, either at the server 102 or remotely, may be implemented in the system 500 in accordance with the invention.

After the item or items are selected for text generation, control may pass to a block 604 wherein a first one of the user-selected items is selected by the system 500 to begin the text generation process. Depending on the implementation, block 604 may be executed immediately upon confirmation of the item selections at the user interface, or the user-selected items may be queued for batch processing at a time when sufficient computing resources are available. The date parser/normalizer 502 may be configured to retrieve the information regarding the user's selection of the item, any comparison items specified by the user and, if specified, the type of descriptive text to be generated for the item.

Once the information for the first user-selected item is selected, control may pass to a block 606 wherein the specification information for the user-selected item and the comparison item or items is retrieved from the appropriate sources and normalized to the format necessary for the document generation process. As discussed above, the data parser/normalizer 502 retrieves the specification information for each item from the appropriate location at which the specification information is stored. Depending on the domain, the selected items within the domain, and the particular implementation, the specification information may be stored locally, such as at the database 214 of the NLG server 102, or remotely, such as at the databases 414 of one or more remote item information servers 104 that are accessible over the network 108. Moreover, the required specification information may be stored in different media or different formats. For example, specification information for items from one manufacturer may be available in a relational database, while the information for the items from another manufacturer may be available in word processing documents. Regardless of the sources and formats, the data parser/normalizer 502 retrieves all the necessary specification information and normalizes the information as discussed above to arrive at the values of the specifications of the items necessary to generate the requested item description.

As previously discussed, the user may request the system 500 to compare the user-selected item to a single comparison item, or to a plurality of comparison items. Even where the user requests a description of the item without specifying items for comparison, the system 500 may be configured to select and use a default group of comparison items, such as all other like items or all items within the same class of items, and use the default group in comparisons to generate a description that may be more meaningful and helpful to the user. Where the comparison involves a plurality of comparison items, the data parser/normalizer 502 of the system 500 may merge the normalized values of the specifications into a composite virtual item. Consequently, after the specification information is retrieved and normalized at block 606, control may pass to a block 608 where the data parser/normalizer 502 determines whether a one-to-one or one-to-many item comparison was selected by the user. If a one-to-many comparison will be performed, control passes to a block 610 wherein the data parser/normalizer 502 merges the specification values for the plurality of comparison items into a single composite virtual item.

If a one-to-one comparison is being preformed, or after the composite virtual item is generated at block 610 where a one-to-many comparison is being performed, control passes to a block 612 wherein the specification values, for the user-selected item and the comparison item are compared. As discussed above, the comparator 504 is configured with comparison functions and interpretation rules for making comparisons between the specification values of the user-selected item and the comparison item. The comparator 504 cycles through each of the specification values defining the item and applies the corresponding comparison functions and interpretation rules to evaluate the outcome of each comparison. Representations of the outcomes of each comparison and evaluation are generated and stored by the comparator 504 for later use by the language engine 506 to generate sentences.

After the comparator 504 cycles through all of the specification values for the item, control may pass to a block 614 wherein the language engine 506 begins the sentence generation process by selecting the first specification for which a sentence or sentences will be generated, and then to a block 616 wherein the language engine 506 selects the first sentence template associated with the specification. Before generating a sentence from the sentence template, at a block 618 the language engine 506 may determine whether the sentence has a specified meta-rule that must be evaluated. If the sentence template does not have a specified meta-rule, then control may pass to a block 620 wherein the language engine 506 may generate a sentence from the sentence template. Alternatively, if the sentence template has a specified meta-rule, control may pass to a block 622 wherein the language engine 506 evaluates the meta-rule using the specified specification values for the user-selected item and comparison item. If the conditions specified in the meta-rule are met by the specification values at a block 624, then control may pass to the block 620 to generate a sentence from the sentence template just as it would for a sentence template without an associated meta-rule. If the conditions of the meta-rule are not met at block 624, then the block 620 may be bypassed and no sentence will be generated for the sentence template and, consequently, a sentence generated from the sentence template for the specification will necessarily not appear in the generated natural language description.

After the language engine 506 generates a sentence from the sentence template at block 620, or after the block 620 is bypassed due to the failure of the specifications to satisfy conditions of the meta-rule at block 624, control may pass to a block 626 wherein the language engine 506 determines whether more sentence templates are defined for the current specification of the item. If more sentence templates are defined, control may pass back to block 616 wherein the language engine 506 selects the next sentence template and, depending on the existence and satisfaction of an associated meta-rule, generates a sentence from the next sentence template. If the language engine 506 has processed all of the sentence templates at block 626, then control may pass to a block 628 wherein the language engine 506 determines whether there are more specifications for the item for which sentences are to be generated. If there are more specifications for the item, control may pass back to block 614 wherein the language engine 506 selects the next specification and begins the process of generating sentences from the specifications using the corresponding sentence templates.

If all of the specifications for the item have been processed by the language engine 506 at block 628, control may pass to a block 630 wherein the document generator 508 may assume control of the process and select a discourse model to be used in selecting and combining the generated sentences to create the description of the item. The discourse model may be specified within the system 500 such that the same discourse model or models are used each time a document is generated, or the user may be permitted to select one or more discourse models to generate the desired documents. For example, a selection webpage displayed to a user at a client device 106 as discussed above may allow the user to select an item and one or more comparison items, but may only offer one type of description of the comparison such that the same discourse model is used for all user-selected comparisons. In the case of the user interface at the NLG server 102, the user may be provided with the option of selecting one or more of a plurality of available discourse models depending on the purpose for generating the descriptions. In one implementation, the NLG server may be operated by a service that provides comparative descriptions of items that are tailored to a particular customer's needs, and the system 500 may be configured with discourse models configured for each type of description that may be generated, or with customer-specific discourse models configured with a particular customer's preferences. The user interface may allow the user to select a plurality of the available discourse models so that descriptions may be generated for a number of different customers in a single batch processing cycle.

Once the discourse model is selected at block 630, control may pass to a block 632 wherein the document generator 508 applies the rules set forth in the discourse model to the generated sentences to compile the requested item description in the manner described above. The generated item description may then be stored by the system 500, or output in a desired manner, such as in a hardcopy printout or as part of the text of a subsequent webpage generated for the requesting user and transmitted to and displayed at the client device 106. After the item description is stored and/or output, control may pass to a block 634 wherein the document generator 508 determines whether additional discourse models are to be used in generating additional descriptions for the user-selected item. If additional discourse models are to be used, control may pass back to block 630 for selection of the next discourse model and generation of another item description.

If no more discourse models are specified or selected, control may pass to a block 636 to determine whether there are additional user-selected items for which item descriptions are to be generated. For example, a user interface at the NLG server 102 may allow the user to elect to generate comparative descriptions for each item in a particular item class to the other items within the class. In the automobile domain, it may be desired to compare each sport-utility vehicle to the other sport-utility vehicles in the class and generate corresponding comparative item descriptions. In this case, based on the user's selections, the NLG system 500 may in turn generate comparative descriptions for the Ford Explorer, the Chevy Tahoe, the Oldsmobile Bravada, etc. versus the other sport-utility vehicles on the market and for which the NLG system 500 has access to the vehicles' specifications. Consequently, if additional items are specified for generation of descriptions at block 636, control may pass back to block 604 for retrieval of the next user-selected item. If all user-specified items have been processed and the corresponding descriptions have been generated at block 636, the routine 600 may terminate until a subsequent initiation to generate additional item descriptions.

Those skilled in the art will understand the variations of the routine 600 may be implemented to generate the desired natural language item descriptions. For example, instead of performing all comparisons of the specification values prior to retrieving the sentence templates, the processing of block 612 may be performed immediately preceding block 620. After determining that no meta-rules apply to a sentence template, or that the meta-rules are satisfied, the language engine 506 may access the comparator 504 on a template-by-template basis where comparisons are required generate sentences from the sentence templates. Other variations in the routine 500 to generate the desired descriptions are possible and are contemplated by the inventor as having use in NLG systems 500 in accordance with the invention.

As previously discussed, the sentence templates may include invariant text and coded phrases formatted with a specific syntax that the language engine 506 is configured to interpret in order to generate the specified sentences using the associated specification values for the comparison items. The following is a discussion of one approach for a sentence template syntax that may be used in the NLG software system 500 in accordance with the invention. In this syntax, a phrase is a tuple, or finite list, of abstract and/or fully-specified linguistic structures. Each phrase may minimally contain a phrase head describing the phrase's linguistic type (e.g., noun phrase, adjective, etc.), and a recursive phrase structure that may be partially or fully expanded by the language engine

506 when generating a sentence from the sentence template (e.g., <_D_,really, . . . >, where _D_ is an adverbial head and "really" is the phrase's structure). A phrase may optionally contain attributes, such as the meaning expressed by the phrase, encoded in an implementation-defined manner, irregular forms (e.g., "better" and "best" as irregular comparative and superlative forms of "good," respectively), and the like. Theoretically, no upper limit exists on how many phrase types may be implemented in the syntax strategy and interpreted by the logic of the language engine 506.

Three categories of phrase heads are defined in the present syntax strategy: terminals, denoted as "_X_," where X is the type of the terminal such as "_N_" for noun, "_V_" for verb, etc.; maximal projections, denoted as "XP," where X is a terminal type such as "NP" for a noun projection; and compound heads, which are ordered tuples of terminals and/or maximal projections (e.g., <_P_NP, . . . > representing a preposition followed by a noun projection). The following may be valid terminal types in the present syntax strategy:

| | |
|---|---|
| _J_ | Adjective (e.g., "big") |
| _N_ | Noun (e.g., "car") |
| _P_ | Preposition (e.g. "about", "when it comes to") |
| _D_ | Adverb (e.g., "really") |
| _V_ | Verb (e.g., "cost") |

A phrase's structure may be recursive. The following are examples of legal phrase structures:

```
the _J_ _N_
my _D_ pretty car
indubitably
some _N_
_P_ NP
```

Phrase attributes may include a phrase head's meaning encoded in an implementation-defined manner (e.g., "big"), as well as morphosyntactic and/or semantic properties of the phrase head (e.g., whether the phrase may co-occur in a template with another phrase of a given type, such as a noun phrase with an adjective, the degree of an adjective, etc.). In the following phrase examples, the head of the phrase immediately follows the open bracket symbol, the structure of the phrase occurs immediately after the phrase head and follows the first comma, the meaning of the phrase, which is optional, immediately follows the phrase structure after the second comma, and other attributes, if any, appear in the remainder of the phrase before the close bracket symbol:

```
<_D_,clearly,definiteness,1>
<NP,the _J_ _N_,,definite,with_determiner,with_adj>
<_J_,good,good,better,best>
```

A template is a syntactically- and semantically-rich abstract model for a natural language sentence. A template may be comprised of an ordered tuple of phrases with optional textual information, a comparison function, and a set of specifications to which the template applies. Moreover, the template may include any amount of invariant textual information at any point in its structure so that a syntactically correct sentence may be generated from the template. Optional information, which may include invariant text and/ or phrases, is enclosed in square brackets [ ]. In the following example, the invariant textual information is underlined:

```
The<_J_,ample,comparative> interior dimensions of
<NP,vehicle_name,%1,definite,sing> make it [<_D_,much>]
<_J_,roomy,comparative> for your passengers than
<NP,vehicle_name,%2,definite,sing>
```

Each template is instantiated by the language engine 506 based on the results of the comparison function(s) and interpretation rule(s) for the item specifications associated with the template. The comparison function(s) associated with a template's specifications are evaluated by the comparator 504, and the template is instantiated for that specification based on the comparison function's output for that specification. In other words, a template associated with several specifications may be instantiated differently for each of its associated specifications, because the comparison function(s) and/or interpretation rule(s) may yield different outputs for the same items for different specifications. Moreover, meta-rules may be used in lieu of comparison functions. Templates can be specific and only apply to one specification (e.g., a template expressing the concept of acceleration may only be relevant to the "torque" specification in the automotive domain), or general and apply to more than one specification (e.g., a template expressing the concept of "x is greater than y" is very general and can apply to length, price, overall size, etc.). Each template must be associated to at least one specification, but there is no upper limit on the number of specifications to which a given template can be associated.

The process of producing human language output from a sentence template is defined as the instantiation of that template. In order to be instantiated, each phrase in a given template must undergo recursive expansion. The language engine 506 may be configured to expand phrases and templates according to, for example, the following rules. If the phrase's head is a terminal, the language engine 506 may look up in a database of terminal elements for the system 500 all terminal elements whose properties positively or vacuously match the phrase's properties. If the phrase's head is or contains a maximal projection, the language engine 506 may look up in a database of phrases for the system 500 all phrases whose attributes positively or vacuously match the phrase's attributes, and recursively expand these phrases if applicable. For example, a <PP, . . . > prepositional phrase may be expanded as <_P_NP, . . . > (i.e., a preposition terminal and a noun phrase). The embedded noun phrase "NP" may then be expanded as <_D_ _J_ _N_, . . . > (i.e., adverb, adjective and noun terminals), and each of the terminals in this expansion is expanded as described above.

At every step of a phrase's expansion, the partially-expanded fragment inherits the attributes of the expanded phrases embedded in it. If the next embedded phrase to be expanded has attributes that conflict with its partially expanded parent phrase, the next embedded phrase may be discarded. Also at every step of a phrase's expansion, if a parent phrase's attributes include requirements (morphosyntactic, semantic, etc.) that apply to the embedded phrase being expanded, the embedded phrase is expanded according to these requirements. These requirements may include but are not limited to the application of morphosyntactic rules (e.g., plural formation), the selection of irregular forms, and the like. A template's complete instantiation is the recursive generation of all possible combinations of the fully-expanded phrases comprising the template.

Where a phrase includes compound meanings, the meanings are listed in a single meaning slot (e.g. meaning1+meaning2(+meaning3 . . . )). Compound meanings are used for phrases whose heads are maximal projections, or include maximal projections which include maximal projections themselves, such as <PP, . . . >, which may expand as <_P_NP, . . . > Each individual meaning in a compound meaning is assigned to each element in the expansion of the head, in order, without skipping phrases. For example, in the phrase <PP,about+gas_mileage, . . . >, the head <PP, . . . > may be expanded to <_P_NP, . . . > reflecting a preposition terminal and a noun phrase. The expanded phrase <_P_NP, . . . > will then be further expanded with the meaning "about" being used for the expansion of the preposition terminal "_P_," and the meaning "gas_mileage" being used for the expansion of the noun phrase "NP." If the meaning is not specified for the phrase, the slot must still be present in the phrase and left blank.

When using the adverb terminal "_D_," the adverb's degree of emphasis may be encoded in the phrase on a scale of "1" through "3," with "1" indicating no particular emphasis, "2" indicating moderate emphasis, and "3" indicating the most emphatic form of the adverb. Where the adverb terminal is used, the adverb's degree may be listed immediately after the position reserved for the phrase meaning, such as <_D_, ridiculously,much,3>. For adjective terminals "_J_," the adjective's comparative and superlative forms are listed even if they are regular. As with, the adverb's degree, the adjective forms are listed immediately after the position reserved for the phrase meaning, and with the comparative form listed first. Alternate implementations may include flagging of regular forms for morphosyntactic processing instead of explicitly listing the regularly-derived forms (e.g., <_J_, heavy,heavy,heavier,heaviest>.

During expansion, arbitrary values for any phrase can be specified by including "% n" in the meaning slot, where n is the order in which the given arbitrary value occurs in the list of comparison outcomes passed to the comparator starting from 1. The output representations of the comparison functions from the comparator 504 (e.g., "greater than") are based on the comparison of the first element to the second element in the parameter list. In the following example, % 1 will be expanded as the first vehicle's name and % 2 as the second vehicle's name when passed to the comparator:

```
<NP,vehicle_name,%1,definite,sing,subject> has <_D_,much>
larger tires than <NP,vehicle_name,%2,definite,sing>
```

Embedding comparative or superlative adjectives in a noun phrase (e.g., "the best vehicle") is possible, assuming the database contains noun phrases with embedded adjective phrase maximal projections or adjective terminals, by specifying the adjective's degree as comparative or superlative in the list of attributes of a noun phrase and specifying a compound meaning for the noun phrase with the adjective's meaning as the compound meaning's second element:

```
<NP,vehicle_name,%1,definite,sing> has
<NP,engine+big,indefinite,comparative,with_adj,with_determiner> than
<NP,vehicle_name,%2,definite,sing>
With its <_J_,small> turning radius,
<NP,vehicle_name,%1,definite,sing> is <_D_,definiteness>
<_J_,maneuverable,comparative>, something to consider if you
do a lot of city driving
```

As indicated previously, the syntax strategy described herein is exemplary, and other syntax strategies that may be used with the language engine 506 to generate syntactically correct sentences may be implemented in the NLG software system 500.

In addition to the examples discussed herein, those skilled in the art will understand that an NLG software system in accordance with the invention may be implemented and configured for application in a wide variety of domains to generate natural language descriptions of the items within the domains that may be described in terms of specifications. The NLG software system may be configured to generate descriptions of virtually any consumer products and other types of goods. To the extent they may be defined in terms of specifications, service industry offerings may be described in descriptions generated by an appropriately configured implementation of an NLG software system. As a further example, properly configured NLG software systems may be implemented to describe diverse topics, such as comparisons of athletes and athletic teams based on meaningful specifications such as size, speed, strength, records, and other measurable statistics that may be used as specifications in describing the athletes or teams. Other implementations of NLG software systems in generating item descriptions will be apparent to those skilled in the art and are contemplated by the inventor.

NLG software systems in accordance with the invention overcome many of the limitations in previous DTS systems discussed above. Because the language-generating module is highly abstract and structurally distinct from the data parsing module that provides it with the information upon which the text generation is based, the NLG software system is not limited to a particular domain and can be used to generate text about any domain with structured data with very minor adjustments to its lexicon and data parsing functions. Additionally, because the NLG software system's structural elements are recursive, the system is capable of generating an infinite number of distinct syntactically-correct sentences. The system is also language-independent. The system's structural elements and rules are highly abstract, and extending the system to generate sentences in other languages than American. English only requires relatively minor adjustments to its lexicon, template inventory and grammar rules. Still further, because the system's output is organized by a set of abstract discourse models, the structure of its output can be selected by the system and/or by the user as discussed above.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A method for generating a natural language description of a user-selected item comparing the user-selected item to at least one comparison item, wherein the characteristics of both the user-selected item and the comparison item are defined by a plurality of specifications, the method comprising:

selecting the user-selected item from a list of items stored at a computer-readable storage medium and available for text generation;

selecting the at least one comparison item from the list of items;

retrieving the specifications for the user-selected item and the at least one comparison item from a computer-readable storage medium, each specification including a comparison function that compares the specification for the user-selected item to the specification for the comparison item and a plurality of sentence templates each having a recursive phrase structure including a plurality of coded phrases using one or more of the specification for the user-selected item or the specification for the comparison item;

comparing the specifications for the user-selected item to the specifications for the at least one comparison item at a processing unit operatively coupled to the computer-readable storage medium by evaluating each comparison function to determine a comparison function result;

assigning a textual representation to each comparison function result;

evaluating the plurality of sentence templates to generate at the processing unit a plurality of natural language sentences describing the user-selected item by recursively expanding the recursive phrase structure, wherein the natural language sentences include each assigned textual representation and a recursive expansion result explains the outcome of the comparisons in natural language;

combining at the processing unit the generated natural language sentences into a natural language document describing the user-selected item; and at least one of outputting the natural language document to an output device operatively coupled to the processing unit and storing the natural language document to one of the computer-readable storage medium and a further computer-readable storage medium operatively coupled to the processing unit.

2. A method according to claim 1, wherein retrieving the specifications comprises:

retrieving specification information for the user-selected item and the at least one comparison item from the computer-readable storage medium; and extracting values of each of the specifications from the retrieved specification information.

3. A method according to claim 1, comprising:

normalizing the retrieved specifications for the user-selected item and the at least one comparison item to a uniform format; and comparing the normalized specification information for the user-selected item to the normalized specification information for the at least one comparison item.

4. A method according to claim 1, wherein the user-selected item is compared to a plurality of comparison items, the method comprising:

retrieving the specifications for the plurality of comparison items from the computer-readable storage medium;

merging the specifications for the plurality of comparison items into specifications defining a composite virtual comparison item;

comparing the specifications for the user-selected item to the specifications for the composite virtual comparison item at the processing unit; and generating a plurality of natural language sentences describing the user-selected item, wherein the text of the natural language sentences is determined based on the outcome of the comparisons of the specifications of the user-selected item to the specifications of the composite virtual comparison item.

5. A method according to claim 1, wherein the specifications for an item comprise a plurality of specification values, and wherein comparing the specifications of the items comprises:

comparing a specification value of the user-selected item to the corresponding specification value for the at least one comparison item; and applying an associated interpretation rule to the outcome of the comparison of the specification values to determine the comparison function result.

6. A method according to claim 1, wherein each specification includes an associated meta-rule having an evaluation condition based on values of at least one specification for the user-selected item, the method comprising:

evaluating the evaluation condition of the meta-rule using specification values of both the user-selected item and the comparison item; and generating a natural language sentence in response to determining that the evaluation of the meta-rule is met by the values of the specification for the user-selected item and the comparison item.

7. An apparatus structured to generate a natural language description of a user-selected item comparing the user-selected item to at least one comparison item, wherein the characteristics of both the user-selected item and the comparison item are defined by a plurality of specifications, the apparatus comprising:

a processing unit; and a memory device operatively coupled to the processing unit, the memory device storing a software program structured to cause the processing unit to:

retrieve the specifications for the user-selected item and the at least one comparison item from one of the memory device and a storage medium operatively coupled to the processing unit, each specification including a comparison function that compares the specification for the user-selected item to the specification for the comparison item and a plurality of sentence templates each having a recursive phrase structure including a plurality of coded phrases using one or more of the specification for the user-selected item or the specification for the comparison item, compare the specifications for the user-selected item to the specifications for the at least one comparison item by evaluating each comparison function to determine a comparison function result, assign a textual representation to each comparison function result;

evaluate the plurality of sentence templates to generate a plurality of natural language sentences describing the user-selected item by recursively expanding the recursive phrase structure, wherein the natural language sentences include each assigned textual representation and a recursive expansion result explains the outcome of the comparisons in natural language, and combine the generated natural language sentences into a natural language document describing the user-selected item.

8. An apparatus according to claim 7, wherein the software program is further structured to cause the processing unit to:

retrieve specification information for the user-selected item and the at least one comparison item from one of the memory device and the storage medium; and extract values of each of the specifications from the retrieved specification information.

9. An apparatus according to claim 7, wherein the software program is further structured to cause the processing unit to:

normalize the retrieved specifications for the user-selected item and the at least one comparison item to a uniform format; and compare the normalized specification information for the user-selected item to the normalized specification information for the at least one comparison item.

10. An apparatus according to claim 7, wherein the user-selected item is compared to a plurality of comparison items, the software program is further structured to cause the processing unit to:

retrieve the specifications for the plurality of comparison items from one of the memory device and the storage medium;

merge the specifications for the plurality of comparison items into specifications defining a composite virtual comparison item;

compare the specifications for the user-selected item to the specifications for the composite virtual comparison item; and generate a plurality of natural language sentences describing the user-selected item, wherein the text of the natural language sentences is determined based on the outcome of the comparisons of the specifications of the user-selected item to the specifications of the composite virtual comparison item.

11. An apparatus according to claim 7, wherein the specifications for an item comprise a plurality of specification values, and wherein the software program is further structured to cause the processing unit to:

compare a specification value of the user-selected item to the corresponding specification value for the at least one comparison item; and apply an associated interpretation rule to the outcome of the comparison of the specification values to determine the comparison function result.

12. An apparatus according to claim 7, wherein each specification includes an associated meta-rule having an evaluation condition based on values of at least one specification for the user-selected item, and wherein the software program is further structured to cause the processing unit to:

evaluate the evaluation condition of the meta-rule using specification values of both the user-selected item and the comparison item; and generate a natural language sentence in response to determining that the evaluation of the meta-rule is met by the values of the specification for the user-selected item and the comparison item.

13. A non-transitory computer readable medium storing a software program structured to cause a server to:

retrieve a plurality of specifications for a user-selected item and for at least one comparison item from a storage medium, each specification including a comparison function that compares the specification for the user-selected item to the specification for the comparison item and a plurality of sentence templates each having a recursive phrase structure including a plurality of coded phrases using one or more of the specification for the user-selected item or the specification for the comparison item;

compare the specifications for the user-selected item to the specifications for the at least one comparison item by evaluating each comparison function to determine a comparison function result;

assign a textual representation to each comparison function result;

evaluate the plurality of sentence templates to generate a plurality of natural language sentences describing the user-selected item by recursively expanding the recursive phrase structure, wherein the natural language sentences include each assigned textual representation and a recursive expansion result explains the outcome of the comparisons in natural language, and combine the generated natural language sentences into a natural language document having a natural language description of the user-selected item comparing the user-selected item to the at least one comparison item.

14. A natural language generation system for generating a natural language description of a user-selected item comparing the user-selected item to at least one comparison item, wherein the characteristics of each item are defined by a plurality of specifications, the system comprising:

a natural language generator server including a central processing unit, a non-transitory memory device, and an interface circuit, wherein the non-transitory memory device stores a plurality of modules executing on the central processing unit, the modules including:

a data parser/normalizer retrieving the specifications for the user-selected item and the at least one comparison item from a storage medium via the interface unit, each specification including a comparison function that compares the specification for the user-selected item to the specification for the comparison item and a plurality of sentence templates each having a recursive phrase structure including a plurality of coded phrases using one or more of the specification for the user-selected item or the specification for the comparison item;

a comparator comparing the specifications for the user-selected item to the specifications for the at least one comparison item by evaluating each comparison function to determine a comparison function result and assigning a textual representation to each comparison function result;

a language engine evaluating the plurality of sentence templates to generate a plurality of natural language sentences describing the user-selected item by recursively expanding the recursive phrase structure, wherein the natural language sentences include each assigned textual representation and a recursive expansion result explains the outcome of the comparisons in natural language; and a document generator combining the natural language sentences generated by the language engine into a natural language document describing the user-selected item.

15. A natural language generation system according to claim 14, wherein the data parser/normalizer retrieves specification information for the user-selected item and the at least one comparison item from the storage medium, and extracts values of each of the specifications from the retrieved specification information.

16. A natural language generation system according to claim 14, wherein the data parser/normalizer normalizes the retrieved specifications for the user-selected item and the at least one comparison item to a uniform format, and wherein the comparator compares the normalized specification information for the user-selected item to the normalized specification information for the at least one comparison item.

17. A natural language generation system according to claim 14, wherein the user-selected item is compared to a plurality of comparison items, wherein the data parser/normalizer retrieves the specifications for the plurality of comparison items from the storage medium, and merges the specifications for the plurality of comparison items into specifications defining a composite virtual comparison item, wherein the comparator compares the specifications for the user-selected item to the specifications for the composite virtual comparison item, and wherein the language engine generates a plurality of natural language sentences describing the user-selected item, wherein the text of the natural language sentences is determined based on the outcome of the comparisons performed by the comparator of the specifications of the user-selected item to the specifications of the composite virtual comparison item.

18. A natural language generation system according to claim 14, wherein the specifications for an item comprise a plurality of specification values, wherein the comparator compares a specification value of the user-selected item to the corresponding specification value for the at least one comparison item, and applies an associated interpretation rule to the outcome of the comparison of the specification values to determine the comparison function result.

19. A natural language generation system according to claim 14, wherein each specification includes a meta-rule having an evaluation condition based on values of at least one specification for the user-selected item, and wherein the language engine evaluates the evaluation condition of the meta-rule using specification values of both the user-selected item and the comparison item, and generates the natural language sentence in response to determining that the evaluation of the meta-rule matches the values of the specification for the user-selected item and the comparison item.

* * * * *